US012485304B2

(12) United States Patent
Järvinen

(10) Patent No.: US 12,485,304 B2
(45) Date of Patent: Dec. 2, 2025

(54) FIRE SUPPRESSION SPRINKLER DEVICE

(71) Applicant: Marioff Corporation Oy, Vantaa (FI)

(72) Inventor: Samuli Järvinen, Vantaa (FI)

(73) Assignee: MARIOFF CORPORATION OY, Vantaa (FI)

( * ) Notice: Subject to any disclaimer, the term of this patent is extended or adjusted under 35 U.S.C. 154(b) by 461 days.

(21) Appl. No.: 17/897,945

(22) Filed: Aug. 29, 2022

(65) Prior Publication Data

US 2023/0061990 A1 Mar. 2, 2023

(30) Foreign Application Priority Data

Aug. 31, 2021 (EP) .................................... 21194130

(51) Int. Cl.
*A62C 31/05* (2006.01)
*A62C 99/00* (2010.01)

(52) U.S. Cl.
CPC .......... *A62C 31/05* (2013.01); *A62C 99/0018* (2013.01)

(58) Field of Classification Search
CPC ......... A62C 31/05; A62C 37/14; A62C 35/68; A62C 35/58
See application file for complete search history.

(56) References Cited

U.S. PATENT DOCUMENTS 1,758,767 A 5/1930 Taggart
4,700,894 A 10/1987 Grzych
5,513,708 A * 5/1996 Sundholm .......... A62C 99/0072 251/282
5,944,113 A * 8/1999 Sundholm .............. A62C 37/14 169/37
6,230,815 B1 * 5/2001 Sundholm .............. A62C 37/14 169/56
6,318,474 B1 * 11/2001 Sundholm ................. B05B 1/00 169/37
6,345,670 B1 * 2/2002 Sundholm .............. A62C 31/05 169/59
6,347,669 B1 * 2/2002 Sundholm .............. A62C 31/05 169/59
6,810,910 B2 * 11/2004 McHugh ............. F16K 11/0873 239/DIG. 15
6,976,544 B2 * 12/2005 Sundholm .............. A62C 37/14 169/41

(Continued)

FOREIGN PATENT DOCUMENTS

CN 1730163 A 2/2006
CN 204275361 U 4/2015

(Continued)

OTHER PUBLICATIONS

European Search Report for Application No. 21194130.7; Issued Feb. 28, 2022; 7 Pages.

*Primary Examiner* — Joseph A Greenlund
(74) *Attorney, Agent, or Firm* — CANTOR COLBURN LLP

(57) ABSTRACT

A fire suppression sprinkler device 100 includes a sprinkler bulb 140, a nozzle manifold 160, and a conduit 190 for supplying fluid to the nozzle manifold 160. The sprinkler device 100 is arranged so that breakage of the sprinkler bulb 140 permits fluid communication from the interior of the conduit 180 to the nozzle manifold 160. The nozzle manifold 160 is disposed about the conduit 190.

18 Claims, 2 Drawing Sheets

(56) References Cited

U.S. PATENT DOCUMENTS

| | | | | |
|---|---|---|---|---|
| 7,607,594 | B2 * | 10/2009 | Saripalli | B05B 1/00 73/644 |
| 9,682,262 | B2 * | 6/2017 | Huotari | F16K 25/005 |
| 9,821,179 | B2 * | 11/2017 | Kristensen | B05B 1/14 |
| 9,849,321 | B2 * | 12/2017 | Huotari | A62C 37/14 |
| 10,507,343 | B2 * | 12/2019 | Agan | A62C 99/0018 |
| 2003/0000712 | A1 | 1/2003 | Franson | |
| 2008/0128143 | A1 * | 6/2008 | Yu | A62C 35/605 169/16 |
| 2011/0121099 | A1 * | 5/2011 | Han | B05B 7/0425 239/263 |
| 2013/0075499 | A1 * | 3/2013 | Jeon | A62C 31/05 239/558 |
| 2013/0126192 | A1 * | 5/2013 | Bygbjerg | A62C 31/05 169/37 |
| 2014/0138102 | A1 | 5/2014 | Corn et al. | |
| 2015/0297929 | A1 * | 10/2015 | Huotari | A62C 35/58 169/56 |
| 2017/0157442 | A1 * | 6/2017 | Huotari | A62C 31/02 |
| 2019/0143162 | A1 * | 5/2019 | Silva, Jr. | A62C 35/68 169/70 |
| 2020/0038701 | A1 * | 2/2020 | Li | A62C 37/14 |
| 2020/0156089 | A1 * | 5/2020 | Mercnik | B05B 1/26 |
| 2020/0346058 | A1 * | 11/2020 | Kempf | A62C 35/68 |
| 2023/0061990 | A1 * | 3/2023 | Järvinen | A62C 99/0018 |

FOREIGN PATENT DOCUMENTS

| | | | |
|---|---|---|---|
| CN | 204469927 | U | 7/2015 |
| CN | 205659304 | U | 10/2016 |
| CN | 206435358 | U | 8/2017 |
| CN | 208865788 | U | 5/2019 |
| CN | 208976081 | U | 6/2019 |
| DE | 10152771 | A1 | 6/2003 |
| EP | 0797466 | B1 | 1/2000 |
| EP | 0692280 | B1 | 4/2000 |
| EP | 0972574 | B1 | 12/2003 |
| EP | 1728535 | A2 | 12/2006 |
| EP | 2586537 | A1 | 5/2013 |
| EP | 2924356 | A1 | 9/2015 |
| EP | 3107630 | A1 | 12/2016 |
| EP | 2582436 | B1 | 10/2018 |
| EP | 3482800 | A1 | 5/2019 |
| FR | 2808227 | A1 | 11/2001 |
| FR | 2808229 | A1 | 11/2001 |
| JP | 5345538 | B2 | 11/2013 |
| KR | 200388089 | Y1 | 6/2005 |
| WO | 02094448 | A1 | 11/2002 |
| WO | 2020028731 | A1 | 2/2020 |
| WO | 2021028809 | A | 2/2021 |

* cited by examiner

FIRE SUPPRESSION SPRINKLER DEVICE

FOREIGN PRIORITY

This application claims priority to European Patent Application No. 21194130.7, filed Aug. 31, 2021, and all the benefits accruing therefrom under 35 U.S.C. § 119, the contents of which in its entirety are herein incorporated by reference.

TECHNICAL FIELD OF INVENTION

The present invention relates to a fire suppression sprinkler device, and more specifically, a fire suppression sprinkler devices for cold area fire protection.

BACKGROUND OF THE INVENTION

Fire suppression sprinkler devices are often used in offices, warehouses, car parks and other similar structures to provide a means to extinguish fires. These devices are typically provided with a fire suppressant which is released from nozzles in the device when the device is exposed to elevated temperatures from a fire. Specifically, sprinkler devices typically include sprinkler bulbs which are arranged to break at predetermined temperatures indicative of a fire (or indicative of a risk of fire), and thereby cause the sprinkler to emit fire suppression fluid. Sprinkler bulbs therefore operate as a type of mechanical fuse, which release fire suppression fluid from an associated source when they break.

Locations such as car parks and warehouses can be subject to freezing temperatures either periodically, or permanently in the case of freezer storage areas in a warehouse for example, which can cause fluid, such as water, in or on the fire suppression sprinkler device to freeze. When fluid freezes at the fire suppression sprinkler device there is a risk that the nozzles of the device may be blocked or the means of activating the sprinkler device (e.g. a valve) may be stuck or blocked. Therefore, the effectiveness and response time of a fire suppression sprinkler device may be significantly affected by the freezing temperatures.

EP 2582436 B1 discloses a sprinkler device, wherein the sprinkler device is oriented vertically above a fire suppressant supply pipe.

Given that fire suppression systems are safety critical, a need exists for an improved fire suppression sprinkler device for cold environments.

SUMMARY OF THE INVENTION

Viewed from a first aspect, the present invention provides a fire suppression sprinkler device comprising: a sprinkler bulb; a nozzle manifold; and a conduit for supplying fluid to the nozzle manifold; wherein the sprinkler device is arranged so that breakage of the sprinkler bulb permits fluid communication from the interior of the conduit to the nozzle manifold; and wherein the nozzle manifold is disposed about the conduit.

In use, the conduit may receive fluid flow from a supply pipe, and may receive fluid flow directly from the supply pipe. The conduit may therefore cooperate with the supply pipe to define a substantially continuous flow path for water, fire suppression fluid, compressed gas, etc. The conduit may therefore define a portion of a fluid flow path through the sprinkler device (e.g. in cooperation with the supply pipe), and the nozzle manifold may be disposed about that portion of the fluid flow path. In other words, the conduit of the sprinkler device may be the part of the sprinkler device that forms the fluid flow path of a fire suppression system.

Advantageously the conduit does not block or limit the direction in which fluid can be directed during a fire suppression event since the nozzle manifold is disposed about the conduit e.g. wrapped around the conduit. The direction in which fluid can be sprayed is also not limited by the supply pipe, since the nozzle manifold sprays fluid outwards (e.g. radially outwards) from the conduit and hence also from the supply pipe. Since the nozzle manifold is disposed about the conduit, a portion of the nozzle manifold located below the conduit (and supply pipe) provides a flow path for fluid to drain from the fire suppression sprinkler device due to gravity. That is, any fluid within the fire suppression sprinkler device, be it condensation or residual fluid from a previous fire suppression event etc., can drain from the device rather than collect and possibly freeze. This advantageously prevents fluid freezing in the fire suppression sprinkler device if the device is subject to freezing temperatures.

The sprinkler bulb may be configured to break at a predetermined temperature. That is, in the event of a fire the sprinkler bulb may break due to the elevated temperatures and fluid may subsequently be provided from the interior of the conduit to the nozzle manifold. The sprinkler bulb may comprise a sealed, frangible housing, and the housing may contain a fluid. The sprinkler bulb may be configured so that the housing breaks when the fluid reaches a predetermined temperature, and/or when it is subject to a predetermined pressure from the fluid in the housing. The sprinkler bulb may be arranged so that the housing cracks, bursts, shatters or otherwise breaks under predetermined conditions, for example predetermined conditions indicative of a fire event (e.g. when subject to a predetermined temperature), so that the sprinkler bulb may be used for activating the sprinkler device and/or a fire suppression system when the predetermined conditions are met. The sprinkler bulb may be suitable for preventing release of a fire suppressant or the like from the sprinkler device unless it breaks. For example, the sprinkler bulb may be configured to break, shatter or burst, when its temperature reaches a predetermined threshold. The sprinkler bulb may be arranged so that when it is intact it may support a predetermined mechanical load, e.g. for maintaining a mechanism (e.g. a seal, valve or plug) in a condition in which fluid communication from the interior of the conduit to the nozzle manifold is prevented. The sprinkler device may be arranged so that the sprinkler bulb is disposed above the conduit in use. The sprinkler bulb may therefore be disposed above the supply pipe during use. The sprinkler bulb (and/or bulb housing) may project from the nozzle manifold e.g. project upwardly from the nozzle manifold.

The nozzle manifold may comprise a distribution volume about the conduit. The distribution volume may be bounded by an exterior of the conduit and an interior of the nozzle manifold, the distribution volume may be arranged to communicate fluid from within the interior of the conduit to nozzles of the nozzle manifold. The distribution volume may have an annular shape, bounded by an exterior of the conduit and an interior surface of the nozzle manifold. Thus, the nozzle manifold may be configured so that it receives fluid from the conduit into the fluid distribution volume, which distribution volume is disposed outside and around the conduit. The distribution volume may substantially surround the conduit. Fluid leaving the conduit during a fire suppression event may therefore flow around the conduit before exiting the nozzle assembly e.g. in a direction perpendicular to the fluid flow path through the sprinkler device. This allows fluid to be sprayed outwardly from the conduit (and from the supply pipe and fluid flow path) without the conduit (or supply pipe) being in the way.

Advantageously the distribution volume provides a means of providing fluid uniformly to the nozzle manifold and hence increases the design flexibility of the nozzle manifold such that it can be in a predetermined configuration to suppress fire in the location that the fire suppression device is installed within. Put simply, since the nozzle manifold surrounds the conduit through which fluid is supplied, it is less restricted in the directions in which it can disperse that fluid.

The nozzle manifold may comprise a recess for collecting fluid from the distribution volume. The recess may be in the interior of the nozzle manifold and may be at the bottom of the interior of the nozzle manifold in use. The recess may be configured to provide a collection chamber e.g. for condensation and/or fire suppression fluid. The recess may be in fluid communication with one or more nozzles of the nozzle manifold.

Advantageously, the recess allows condensation or residual fluid to accumulate in the recess. If the fire suppression sprinkler device is then subject to freezing temperatures the condensation or fire suppression fluid is less likely to freeze in proximity of the nozzles as it will instead collect in the recess, which reduces the likelihood of the nozzles being blocked by the fluid freezing. That is to say, the recess reduces the likelihood of ice forming in the nozzles and subsequently blocking the nozzles e.g. preventing the release of fire suppression fluid in the event of an emergency. The effectiveness of the fire suppression sprinkler device can therefore be maintained in freezing conditions.

The nozzle manifold may comprise a plurality of nozzles, at least one nozzle being configured to eject fluid radially outwards from the conduit. The nozzle may therefore expel fluid in a direction perpendicular to the direction of fluid flow through the conduit and/or supply pipe. The nozzles may all be configured to direct fluid flow outwardly from the conduit and/or the supply pipe. Thus, the conduit and/or supply pipe does not block fluid leaving the sprinkler device during use and does not reduce the area covered by the sprinkler device. The nozzle manifold may comprise any suitable number and arrangement of nozzles. The nozzle manifold may comprise nozzles spaced about its periphery. The nozzle manifold may comprise nozzles arranged to release fluid in an upward direction e.g. above and away from the conduit and/or supply pipe.

At least one nozzle may be configured to eject fluid downwards. The nozzle manifold may direct fluid directly downwards. Since the nozzle manifold is disposed about the conduit, its nozzles can advantageously spray fluid downwards (and in any suitable direction) without the conduit and/or supply pipe being in the way. The provision of a directly downward facing nozzle may also allow all fluid in the nozzle manifold to drain under gravity, thereby reducing the risk that fluid might freeze in the sprinkler device during cold conditions and thereby block it.

The plurality of nozzles may be configured to eject fluid in a circular (and/or spherical) direction outwardly from the conduit. For example, because the nozzle manifold surrounds the conduit and fluid flow path, fluid can be sprayed in all directions without the conduit or supply pipe blocking it.

The nozzle manifold may be configured to spray fluid in a downward direction and an upward direction simultaneously. Since the sprinkler device does not reside on the end of a supply pipe or fluid flow path, its nozzles need not receive fluid with an existing momentum or trajectory, and thus it is straightforward to direct fluid in any desired direction.

The nozzle manifold may be take any suitable shape for providing a predetermined arrangement of nozzles. For example, the nozzle manifold may be elongated in a vertical direction, with the sprinkler bulb above the conduit and at least some of the nozzles below the conduit. The nozzle manifold may be flattened in one direction, or may be curved or rounded as required for a predetermined nozzle arrangement.

The sprinkler device may be arranged so that in use fluid does not exit the nozzle manifold past the sprinkler bulb and/or sprinkler bulb housing. The sprinkler bulb may be disposed on an opposite side of the conduit to at least one nozzle of the nozzle manifold. The sprinkler bulb may be disposed on an opposite side of the nozzle manifold to a least one nozzle. The conduit (and fluid flow path for supplying fire suppression fluid to the sprinkler device) may therefore be disposed between the sprinkler bulb and at least one nozzle of the nozzle manifold. The sprinkler bulb may be disposed opposite a plurality of nozzles.

The nozzle manifold may comprise a plurality of nozzles, at least one nozzle may have a first cross sectional area and a second cross sectional area, the second cross sectional area may be greater than the first cross sectional area. There may be a step change in the cross-section of the nozzle. A plurality or all of the nozzles may be so configured.

At least one nozzle may have a number of cross sectional areas which increase in size from an inner portion of the nozzle manifold, nearer to the conduit than the exterior of the nozzle manifold, to an outer portion, nearer to the exterior of the nozzle manifold than the conduit. The nozzle may be tapered. The nozzle may thereby be configured to spray a mist of fire suppression fluid during use.

At least one nozzle may be configured to eject fluid in a mist. This advantageously increases the area covered by the fluid when ejected. A plurality or all of the nozzles may be so configured.

The fire suppression sprinkler device may comprise a valve, the valve may be configured to prevent fluid communication between the interior of the conduit and the nozzle manifold until breakage of the sprinkler bulb. The valve may comprise an actuable element (e.g. a plug, spool or piston or the like) fluidly isolating the interior of the conduit from the nozzle manifold. The element may be held in place by the sprinkler bulb only while the sprinkler bulb is intact. Mechanical failure of the sprinkler bulb (e.g. during a fire detection event), may therefore enable the element to move and thereby permit fluid communication between the interior of the conduit and the nozzle manifold. In use, upon breakage of the sprinkler bulb the element may be actuated upwards by any suitable mechanism e.g. a biasing element such as a spring, pressure from fluid within the conduit, and so on. The valve (and/or the valve element) may be configured to prevent fluid communication between the interior of the conduit and the distribution volume about the conduit. The valve may include a biasing member that urges the valve open if the sprinkler bulb breaks. The biasing member may be a spring, or may be any suitable biasing means. The sprinkler device may therefore comprises a biasing member for actuating the element upon breakage of the sprinkler bulb. The fire suppression system may be arranged to provide pressurised fluid to the conduit of the sprinkler device e.g. via the supply pipe.

The valve preventing fluid communication between the interior of the conduit and the distribution volume about the conduit may advantageously provide a single point to activate all the nozzles of the nozzle manifold. That is, only one valve may be required to open the fluid supply to all of the nozzles of the nozzle manifold. The nozzles of the sprinkler device may therefore all be simply supplied with fire suppression fluid when needed. The valve also advantageously prevents fluid being in the nozzle manifold of the fire sprinkler device when not required, which fluid may otherwise freeze and reduce the effectiveness of the device when the device is subject to freezing temperatures.

The sprinkler bulb may be positioned vertically upwards above the conduit in use. Since hot air rises the sprinkler bulb being positioned vertically may advantageously increase the responsiveness of the fire suppression sprinkler device. That is, in the event of a fire, the region above the conduit is likely to reach a temperature at which the sprinkler bulb is configured to break earlier than a region below the conduit for example. Furthermore, the sprinkler bulb being positioned above the conduit, rather than say below the conduit for example, prevents an area of concern below the fire suppression sprinkler device from being blocked from receiving fluid, e.g. fire suppressant, by the sprinkler bulb. The sprinkler device may be an upright sprinkler device e.g. having the sprinkler bulb projecting upward from the sprinkler device rather than downward.

The sprinkler bulb may be housed within a sprinkler bulb housing. The sprinkler bulb may abut the sprinkler bulb housing at one end and the valve at the other end. The valve may be biased to open but due to the sprinkler bulb abutting the valve may be held closed. When the sprinkler bulb breaks the valve may open due to the bias. Advantageously a simple fire suppression activation means is achieved without requiring external control for example.

The conduit may be configured to be fluidly coupled to the supply pipe. The conduit may be a branched pipe. The conduit may be configured to be branched by being fluidly coupled to a supply pipe at a first opening, a second supply pipe at a second opening and the sprinkler device at a third opening. The conduit in the branched configuration may have a T junction configuration. The conduit may be a terminus pipe. The conduit may be configured to fluidly couple the supply pipe to the fire sprinkler device such that fluid provided by the supply pipe terminates at the sprinkler device.

The conduit may pass through the sprinkler device e.g. all the way through from one side of the sprinkler device to the other. The conduit may therefore provide a portion of a fluid flow path for the fire suppression system. The sprinkler device may be arranged so that fluid may flow through it even when the it is not distributing fluid e.g. even while the sprinkler bulb is intact. The conduit may comprise a first opening for connection to a supply pipe of the fire suppression system, and a second opening for connection to another supply pipe of the fire suppression system, so that the conduit co-operates with the supply pipes to provide a fluid flow path for the fire suppression system. The sprinkler device may be arranged so that the conduit may be connected to supply pipes at opposite ends thereof. The sprinkler device may comprise a first coupling (e.g. a first nut or first fastener) for fluidly connecting a first end of the conduit to a first supply pipe, and a second coupling (e.g. second nut or second fastener) for fluidly connecting a second end of the conduit to a second supply pipe. The conduit may comprise an aperture for supply fluid to the nozzle manifold. The fire suppression sprinkler device may comprise a seal configured to seal the connection between the conduit and the supply pipe(s).

Advantageously, the conduit allows the fire suppression sprinkler device to be located with ease along supply pipes when used as part of a fire suppression system.

Viewed from a second aspect, the present invention provides a fire suppression system comprising: a supply pipe; and a fire suppression sprinkler device as recited in any preceding claim, wherein the fire suppression sprinkler device is fluidly coupled to the supply pipe.

The conduit of the sprinkler device may receive fluid from the supply pipe. The conduit may supply fluid to the supply pipe downstream. The supply pipe and the conduit may therefore cooperate to provide a fluid flow path for fire suppression fluid. The fire suppression system may comprise a plurality of fire suppression sprinkler devices on a single flow path (and/or may comprises a plurality of supply pipes, each with one or more sprinkler devices thereon). The fire suppression system may comprise a fluid flow path through the sprinkler device e.g. when the sprinkler is not open.

The fire suppression system may be installed in a location that may be subject to cold or freezing temperatures either permanently or periodically. The fire suppression sprinkler system may be installed in a car park, multi-storey car park, warehouse, cold warehouse, offices, stadiums, train stations, train depots, airports, aircraft hangers, tunnels and the like. The fire suppression system may be installed in cold climates e.g. northerly or southerly locations.

The fire suppression system may be installed in a vertically upper position of the structure it is located within. That is, the fire suppression system may be installed near the ceiling or roof for example and may be configured to provide fire suppressant to the area below.

The fire suppression system may comprise a fire suppressant source for expelling fire suppressant; and a supply valve in fluid communication with the supply pipe(s) and the fire suppressant source. The fire suppression system may be configured to have a first state, wherein the supply valve is closed to prevent fluid communication between the supply pipe and the fire suppressant source, and a second state, wherein the supply valve is open to allow fluid communication between the supply pipe and the fire suppressant source.

Thus, the fire suppression system may transition between a first state in which fire suppressant fluid is not supplied to the sprinkler device (or sprinkler devices), and a second state in which fire suppressant fluid is supplied to the sprinkler devices.

The fire suppressant may be water or any suitable fire suppressant fluid. The fire suppressant may be provided at pressure, e.g. at pressure higher than ambient pressure. The fire suppressant may be supplied at 10 bar, 50 bar, 100 bar, or 140 bar, or any suitable pressure. The supply valve may be a dry pipe valve.

The fire suppression system may be configured to have compressed gas within the supply pipe when in the first state and the fire suppression system may be configured to transition from the first state to the second state responsive to a drop in pressure of the compressed gas below a predetermined pressure.

The compressed gas pressure may drop when at least one of the sprinkler bulbs of the fire suppression sprinkler device breaks. When the fire suppression system is in the second state fire suppressant is provided to the fire suppression sprinkler device from the fire suppressant source via the supply pipe.

Advantageously, as compressed gas may be held within the supply pipe in the first state the risk of fluid freezing is reduced. This reduces the risk of the valve of the sprinkler device being frozen shut.

The fire suppression system may comprise a compressed gas source configured to supply compressed gas to the supply pipe when the fire suppression system is in the first state.

Viewed from a third aspect, the present invention provides a method of fire suppression comprising supplying fire suppression fluid from an interior of a conduit to a distribution volume about the conduit, and further comprising supplying the fluid from the distribution volume to a nozzle of a nozzle manifold disposed about the conduit.

The fire suppression fluid may be supplied from the interior of the conduit to the distribution volume responsive to a temperature reaching a predetermined temperature. For example the fire suppression fluid may be supplied from the interior of the conduit to the distribution volume responsive to a sprinkler bulb breaking.

The method may comprise the step of supplying fire suppression fluid from a fire suppression fluid source to the conduit via a supply pipe in response to the pressure of a compressed gas within the supply pipe falling.

Advantageously, as compressed gas is held within the supply pipe until there is a fire, fluid freezing in the supply pipe is reduced.

The method may comprise ejecting the fire suppression fluid from the nozzle of the nozzle manifold in a direction radially outwards from the conduit.

Advantageously, fire suppressant can be directed to all areas surrounding the conduit. That is, the conduit does not block the supply of fire suppressant.

The method may comprise providing and/or using any of the features described herein with reference to the first and/or second aspect(s) of the invention.

BRIEF DESCRIPTION OF THE DRAWINGS

Certain preferred embodiments of the present invention will now be described in greater detail, by way of example only and with reference to the following figures, in which.

DETAILED DESCRIPTION OF THE INVENTION

Figure 1:
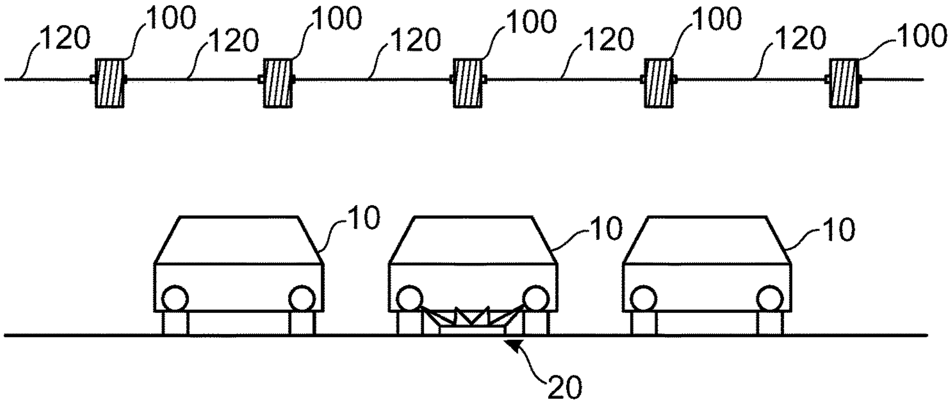
FIG. 1 shows fire suppression sprinkler devices installed in a car park.

FIG. 1 shows fire suppression sprinkler devices 100 installed within a car park or parking garage. Fire suppression sprinkler devices 100 are connected in series to supply pipes 120 at an upper location of the car park, i.e. above the cars 10.

If a fire 20 occurs the temperature in the car park will increase. If the temperature reaches a predetermined temperature a sprinkler bulb 140 (see FIGS. 2 and 3) of at least one of the fire suppression sprinkler devices 100 will break thereby activating the sprinkler device 100.

When a fire suppression sprinkler device 100 is activated, i.e. the sprinkler bulb 140 has broken (e.g. the sprinkler device 100 has been activated by the sprinkler bulb 140 breaking), fire suppressant fluid is provided from a fire suppressant source via supply pipes 120 to each of the fire sprinkler devices 100. The fire suppression sprinkler devices 100 that have a broken bulb 140 subsequently eject fire suppressant to the region surrounding the fire suppression sprinkler device 100 to suppress the fire 20.

Figure 2A:
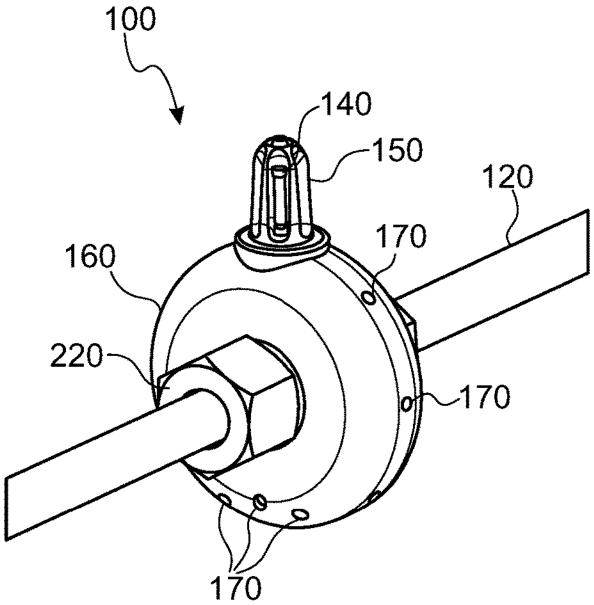
FIG. 2A shows a fire suppression sprinkler device.
Figure 2B:
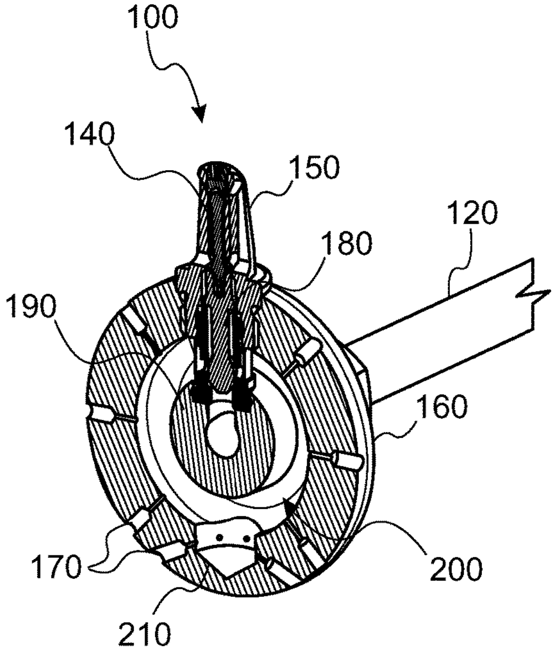
FIG. 2B shows a cross section of the fire suppression sprinkler device of FIG. 2A.

FIGS. 2A and 2B show more detail of a fire suppression sprinkler device 100. The fire suppression sprinkler device 100 comprises a sprinkler bulb 140, housed within a sprinkler bulb housing 150; a nozzle manifold 160 comprising a plurality of nozzles 170; a valve 180; a conduit 190; a fluid distribution volume 200 located between the nozzle manifold 160 and the conduit 190; and a recess 210 in the nozzle manifold 160. The conduit 190 of the fire suppression sprinkler device 100 is fastened and fluidly coupled to a supply pipe 120 on either side of the fire suppression sprinkler device 100. A fastener 220 is provided on either side of the fire suppression sprinkler device 100 to fasten the conduit 190 to each supply pipe 120. The conduit 190 therefore cooperates with the supply pipes 120 to define a fluid flow path for fire suppressant fluid through the sprinkler device 100.

The valve 180 is configured to prevent fluid communication between the interior of the conduit 190 and the fluid distribution volume 200 when in a closed state. The valve 180 is biased to transition to an open state but is held in a closed state by the sprinkler bulb 140. That is the valve 180 abuts the sprinkler bulb 140 which prevents it opening. When the sprinkler bulb 140 breaks, i.e. when the sprinkler bulb 140 reaches a predetermined temperature (due to a fire) and fails, the valve 180 no longer has resistance to opening from the sprinkler bulb 140 and hence opens. Therefore, in the event of a fire fluid is provided via supply pipes 120 to the conduit 190 and to the fluid distribution volume 200 via valve 180.

The fluid distribution volume 200 supplies the fluid to each of the nozzles 170 of the nozzle manifold 160. Fluid therefore flows around the conduit 190 during use. There are a plurality of nozzles 170 arranged radially outward of the conduit 190, a subset being arranged to eject the fluid in a direction radially outward from the conduit 190, that is the fluid is ejected in a direction perpendicular to the flow of fluid within the supply pipe 120 and the conduit 190, and a subset of nozzles 170 are arranged to eject fluid in a direction of the supply pipes 120. The nozzles 170 have two sections, the first with a smaller cross sectional area than the second. The first section being located closer to the fluid distribution volume 200 than the second section. This shape of nozzle 170 results in the fluid leaving the nozzle manifold 160 in a mist or fine spray.

In the event of a fire the nozzles 170 eject fluid from the fluid distribution volume 200 in a mist to the region surrounding the fire suppression sprinkler device 100, the mist being generated by the nozzles 170 having the cross sectional area arrangement described above. Therefore the fire suppression sprinkler device 100 can effectively suppress a fire in the vicinity of the fire suppression sprinkler device 100.

The recess 210 in the manifold 160 is positioned at the lower most point of the interior of the manifold 160 such that it provides a region for condensation and/or residual fluid to accumulate. Thus when the fire suppression sprinkler device 100 is subject to freezing temperatures, the fluid will freeze away from the nozzles and consequently the nozzles will not be blocked.

Figure 3A:
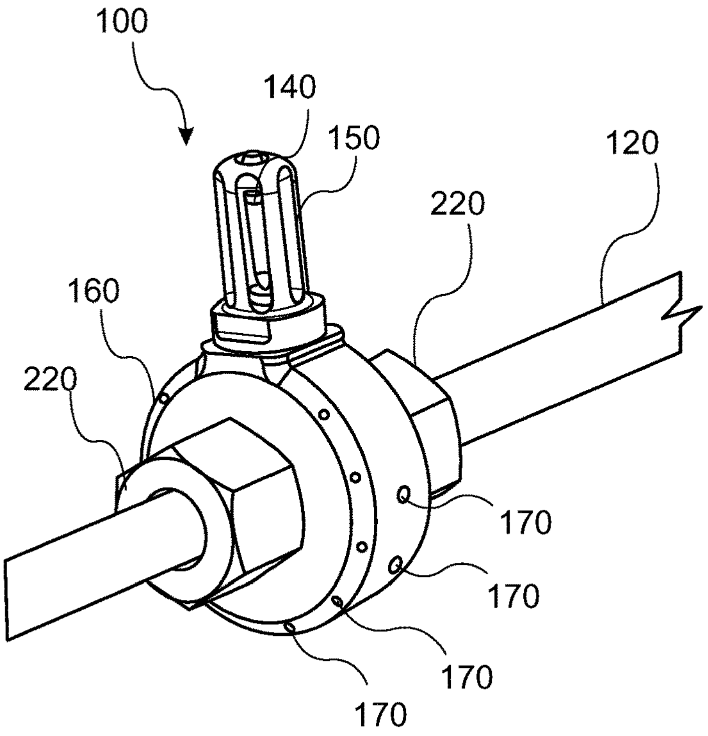
FIG. 3A shows a fire suppression sprinkler device.
Figure 3B:
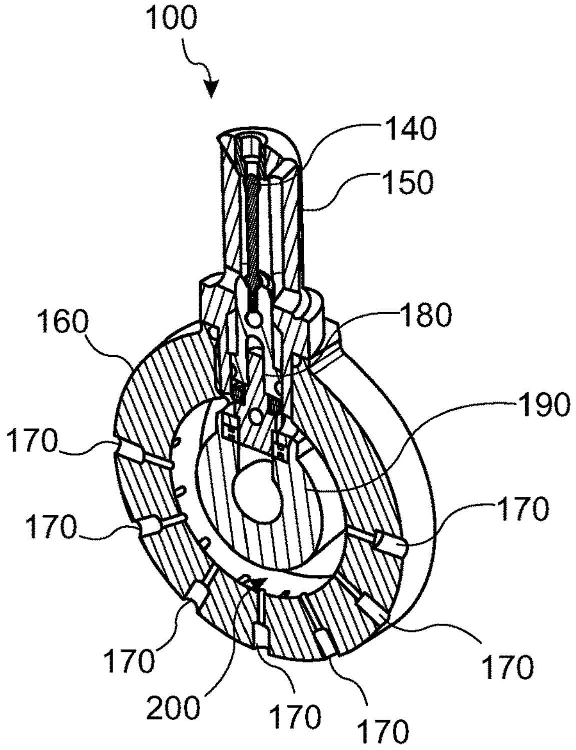
FIG. 3B shows a cross section of the fire suppression sprinkler device of FIG. 3A.

FIGS. 3A and 3B show another a fire suppression sprinkler device 100 (like elements being numbered the same). The fire suppression sprinkler device 100 comprises a sprinkler bulb 140, housed within a sprinkler bulb housing 150; a nozzle manifold 160 comprising a plurality of nozzles 170; a valve 180; a conduit 190; a fluid distribution volume 200 located between the nozzle manifold 160 and the conduit 190, the aforementioned features being configured in a corresponding manner to those features described in relation to FIGS. 2A and 2B.

In FIGS. 3A and 3B, the fire suppression sprinkler device 100 does not have a recess 210, instead a nozzle 170 is provided at the lower most point of the nozzle manifold 160. Residual fluid and/or condensation within the fire suppression sprinkler device 100 is directed to the lower most point of the nozzle manifold 160 due to gravity and subsequently exits via the nozzle 170. Therefore, the freezing of fluids within the fire suppression sprinkler device 100 when subject to cold temperatures is avoided by preventing fluid accumulating in the device 100 when not in use.

Whilst the fire suppression sprinkler devices 100 depicted in FIGS. 2A, 2B, 3A and 3B have substantially annular nozzle manifolds 160 and corresponding substantially annular fluid distribution volumes 200 it will be appreciated that these shapes can be varied according to nozzle number and targeting requirements.

What is claimed is:

1. A fire suppression sprinkler device comprising:
a sprinkler bulb;
a nozzle manifold; and
a conduit for supplying fluid to the nozzle manifold;
wherein the sprinkler device is arranged so that fluid may flow through the sprinkler device while the sprinkler bulb is intact and so that breakage of the sprinkler bulb permits fluid communication from the interior of the conduit to the nozzle manifold;
wherein the sprinkler device is arranged so that the conduit is connectable to supply pipes at opposite ends thereof;
wherein the nozzle manifold is disposed about the conduit;
wherein the sprinkler bulb is positioned vertically upwards above the conduit; and
wherein the nozzle manifold comprises a plurality of nozzles, at least one nozzle being configured to eject fluid downwards and allow fluid in the nozzle manifold to drain under gravity.

2. The fire suppression sprinkler device of claim 1, wherein the nozzle manifold comprises a distribution volume about the conduit.

3. The fire suppression sprinkler device of claim 2, wherein the nozzle manifold comprises a recess for collecting fluid from the distribution volume.

4. The fire suppression sprinkler device of claim 1, wherein the nozzle manifold comprises a plurality of nozzles, at least one nozzle being configured to eject fluid radially outwards from the conduit.

5. The fire suppression sprinkler device of claim 4, wherein at least one nozzle is configured to eject fluid downwards.

6. The fire suppression sprinkler device of claim 1, wherein the nozzle manifold comprises a plurality of nozzles, at least one nozzle having an first cross sectional area and a second cross sectional area, the second cross sectional area being greater than the first cross sectional area.

7. The fire suppression sprinkler device of claim 1, comprising a valve, the valve being configured to prevent fluid communication between the interior of the conduit and the nozzle manifold until breakage of the sprinkler bulb.

8. The fire suppression sprinkler device of claim 1, wherein the conduit is configured to be fluidly coupled to a supply pipe.

9. A fire suppression system comprising:
a supply pipe; and
a fire suppression sprinkler device, as recited in claim 1, wherein the fire suppression sprinkler device is fluidly coupled to the supply pipe.

10. The fire suppression system of claim 9, comprising:
a fire suppressant source for expelling fire suppressant; and
a supply valve in fluid communication with the supply pipe and the fire suppressant source,
the fire suppression system configured to have a first state, wherein the supply valve is closed to prevent fluid communication between the supply pipe and the fire suppressant source, and a second state, wherein the supply valve is open to allow fluid communication between the supply pipe and the fire suppressant source.

11. The fire suppression system of claim 10, wherein the fire suppression system is configured to have compressed gas within the supply pipe when in the first state and the fire suppression system is configured to transition from the first state to the second state responsive to a drop in pressure of the compressed gas below a predetermined pressure.

12. A method of fire suppression comprising:
flowing fluid through a sprinkler device while a sprinkler bulb of the sprinkler device is intact; and
in the event of breakage of the sprinkler bulb, supplying fire suppression fluid from an interior of a conduit to a distribution volume about the conduit, and further comprising supplying the fluid from the distribution volume to a nozzle of a nozzle manifold disposed about the conduit,
wherein the sprinkler device is arranged so that the conduit is connectable to supply pipes at opposite ends thereof;
wherein the sprinkler bulb is positioned vertically upwards above the conduit; and
wherein the nozzle manifold comprises a plurality of nozzles, at least one nozzle being configured to eject fluid downwards and allow fluid in the nozzle manifold to drain under gravity.

13. The method of fire suppression of claim 12, comprising the step of supplying fire suppression fluid from a fire suppression fluid source to the conduit via a supply pipe in response to the pressure of a compressed gas within the supply pipe falling below a predetermined pressure.

14. The method of fire suppression of claim 12, comprising ejecting the fire suppression fluid from the nozzle of the nozzle manifold in a direction radially outwards from the conduit.

15. A fire suppression sprinkler device comprising:
a sprinkler bulb;
a nozzle manifold; and
a conduit for supplying fluid to the nozzle manifold;
wherein the sprinkler device is arranged so that breakage of the sprinkler bulb permits fluid communication from the interior of the conduit to the nozzle manifold; and wherein the nozzle manifold circumferentially encompasses the conduit;

wherein the sprinkler bulb is positioned vertically upwards above the conduit; and wherein the nozzle manifold comprises a plurality of nozzles, at least one nozzle being configured to eject fluid downwards and allow fluid in the nozzle manifold to drain under gravity.

16. The fire suppression sprinkler device of claim 15, wherein the nozzle manifold is circular.

17. The fire suppression sprinkler device of claim 15, wherein the nozzle manifold is curved or rounded.

18. The fire suppression sprinkler device of claim 15, wherein the nozzle manifold is flattened in one direction.

* * * * *